United States Patent [19]

Purpura et al.

[11] Patent Number: 4,769,906

[45] Date of Patent: Sep. 13, 1988

[54] ROUND-TO-FLAT CABLE ASSEMBLY

[75] Inventors: Richard M. Purpura, Burbank; Jack H. Semple, Arlington Heights, both of Ill.

[73] Assignee: Switchcraft, Inc., Chicago, Ill.

[21] Appl. No.: 875,797

[22] Filed: Jun. 18, 1986

[51] Int. Cl.⁴ ........................ H02G 15/06; H01R 43/00

[52] U.S. Cl. .................................... 29/857; 174/74 A; 174/73.1; 439/604

[58] Field of Search ........... 339/102 R, 102 L, 143 R; 29/857, 174; 174/73 R, 72 C, 74 A; 439/126, 604

[56] References Cited

U.S. PATENT DOCUMENTS

| | | | |
|---|---|---|---|
| 3,369,214 | 2/1968 | Krumreich et al. | 339/102 R |
| 4,577,920 | 3/1986 | Coldren et al. | 339/143 R |
| 4,597,624 | 7/1986 | Lax et al. | 339/143 R |

FOREIGN PATENT DOCUMENTS

| | | | |
|---|---|---|---|
| 0039992 | 1/1937 | Netherlands | 174/74 A |

*Primary Examiner*—P. W. Echols

*Assistant Examiner*—Taylor J. Ross

*Attorney, Agent, or Firm*—John T. Meaney; Richard M. Sharkansky

[57] ABSTRACT

An electrical cable assembly comprising a round cable having an end portion provided with an adaptor for terminating the round cable in a flat cable connector. The adaptor has a cylindrical end portion disposed for receiving therein a jacketed end portion of the round cable, an intermediate transitional portion wherein a plurality of conductors extending from the cable end portion are permitted to cross over one another and be formed with an array of juxtaposed conductor end portions, and a rectangular end portion out of which the array of juxtaposed conductor end portions extends. The rectangular end portion is provided with outer dimension and resilient properties similar to an equivalent flat cable for insertion and latching into a flat cable connector where the conductor end portions terminating at respective distances from a mating surface of the adaptor extend into respective grooves and are electrically connected to respective contacts of the connector in a predetermined manner.

15 Claims, 3 Drawing Sheets

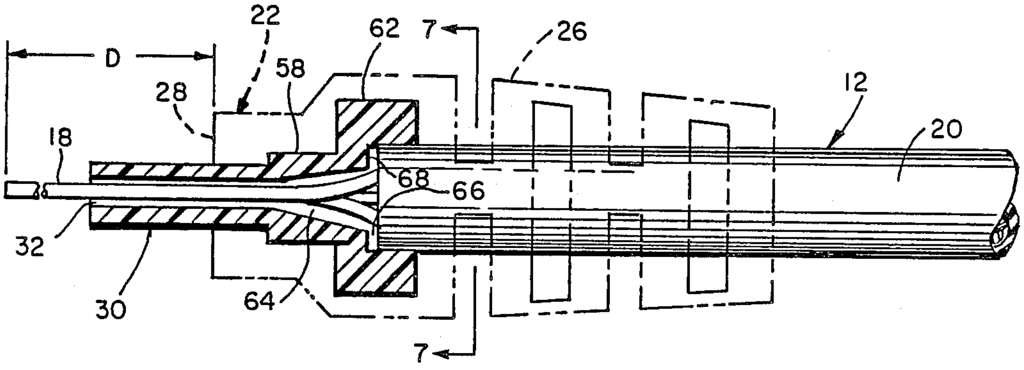
FIG. 5
FIG. 6
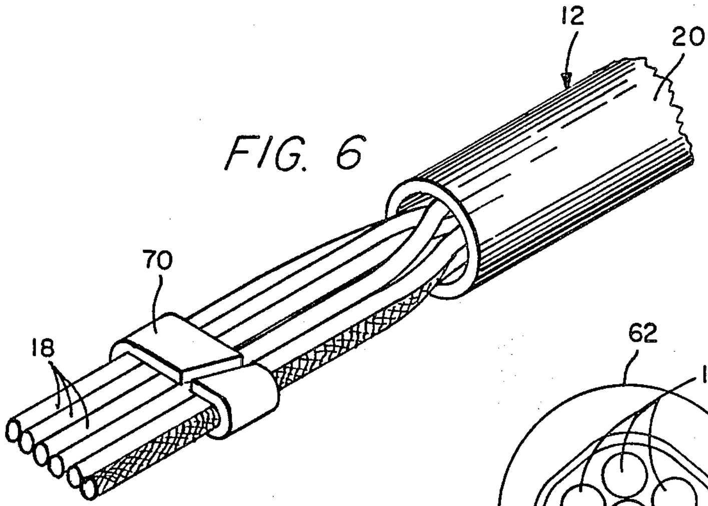
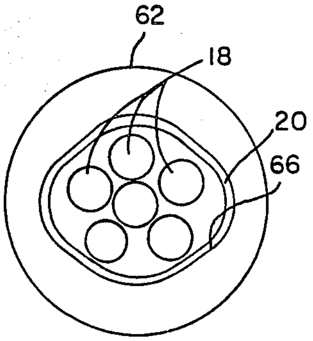
FIG. 7

ROUND-TO-FLAT CABLE ASSEMBLY

BACKGROUND OF THE INVENTION

1. Field of the Invention

This invention relates generally to electrical cable assemblies and is concerned more particularly with an electrical cable assembly having adaptor means for terminating a round cable in a flat cable connector.

2. Discussion of the Prior Art

In a telecommunication system, a modular unit, such as a telephone, for example, may be provided with an externally accessible connector of the receptacle type having a row of laterally spaced contact tangs which are connected electrically to internal circuitry of the unit. Thus, electrical connections may be made to internal circuitry of the unit through a flat cable terminating in a modular telecom plug which is insertable into the receptacle type connector on the modular unit. The modular telecom plug is provided with a row of laterally spaced contact blades which electrically engage respective contact tangs in the receptacle type connector and are electrically connected to respective conductors in the flat cable.

Each of the contact blades has an edge portion protruding from a respective slot in a dielectric body of the modular telecom plug and has an opposing edge portion pressed into electrical engagement with an aligned end portion of a respective conductor in the flat cable. The conductors in the flat cable are disposed in predetermined side-by-side positional relationship with one another and have respective end portions inserted into the proper slots by simply feeding the flat cable through a conformingly configured aperture in the dielectric body of the modular telecom connector. Thus, the flat cable provides means for avoiding any confusion as to which of the conductors in the cable is connected electrically to which of the contacts laterally spaced apart in a row.

In some instances, it may be necessary to make electrical connections to internal circuitry of the modular unit through a round cable, such as a coiled cord, for example. However, the round cable generally does not have the proper size or configuration for terminating in a modular telecom plug suitable for insertion into the receptacle type connector on the unit. Furthermore, the conductors in the round cable are not disposed in predetermined side-by-side positional relationship for being electrically connected to respective contacts in the row of laterally spaced contacts. Consequently, the round cable generally is routed directly into the modular unit for electrically attaching end portions of the conductors in the cable to respective portions of the internal circuitry of the unit. As a result, the round cable cannot be as readily connected to and disconnected from the modular unit as compared to the flat cable terminating in the modular telecom plug.

SUMMARY OF THE INVENTION

Accordingly, these and other disadvantages of the prior art are overcome by this invention providing an electrical cable assembly with adaptor means for terminating a round cable in a flat cable connector. The adaptor means comprises a dielectric bushing of resilient material having a cylindrical tubular end portion defining a cavity for receiving therein a jacket covered end portion of a round cable having protruding axially therefrom a plurality of conductors. The bushing includes an intermediate transitional portion defining a flatted funnel-like passageway which communicates with the cavity and which permits the conductors extending into the funnel-like passageway to cross over one another to lie in predetermined side-by-side positional relationship. Also, the bushing has an opposing rectangular tubular end portion defining a duct-like passageway which communicates with the funnel-like passageway and which receives therefrom the plurality of conductors disposed in predetermined side-by-side positional relationship with one another. The duct-like passageway is provided with a suitable height for restricting the conductors from crossing over one another and thereby maintaining them in the predetermined side-by-side positional relationship.

The rectangular tubular end portion of the bushing has outside dimensions comparable to corresponding dimensions of an equivalent flat cable and, therefore, is readily insertable into a cable receiving aperture of a flat cable connector. When the rectangular tubular end portion of the bushing is inserted into the aperture of a flat cable connector, the conductors emerging from the rectangular tubular end portion are disposed in the proper side-by-side positional relationship for feeding automatically into bottoms of aligned slots. As a result, each of the conductors is electrically connected correctly to a respective contact blade disposed in the slot, as would occur with a conductor of a corresponding flat cable installed in the connector. Also, since the bushing is made of resilient material and has outside dimensions comparable to those of the corresponding flat cable, a latching means provided on the connector for securing thereto the corresponding flat cable also may be used for similarly securing thereto the inserted rectangular end portion of the bushing.

Prior to providing the bushing and cable sub-assembly with the flat cable connector, as described, the end portion of the round cable having the bushing thereon may be subjected to a molding operation whereby the sub-assembly is provided with positive stop means and flexible strain relief means made of moldable resilient material. The positive stop means comprises an annular flange extending outwardly from the rectangular tubular end portion of the bushing and having a surface disposed for butting engagement with the end surface of the connector having therein the aperture into which the rectangular tubular end portion of the bushing is inserted. Accordingly, the rectangular tubular end portion inserted into the aperture may have a terminal end surface spaced a predetermined distance from said surface of the flange for being disposed as desired in the connector when said surface of the flange interfaces with said end surface of the connector. Also, the end portions of the conductors protruding from the duct-like passageway in the rectangular tubular end portion of the bushing may be provided with respective suitable lengths measured from said surface of the annular flange for terminating in the bottoms of the respective slots in the connector when the flange abuts the connector surface having therein the aperture into which the rectangular tubular end portion of the bushing is inserted.

BRIEF DESCRIPTION OF THE DRAWINGS

For a better understanding of this invention, reference is made in the following detailed description to the accompanying drawings wherein:

FIG. 5 is an elevational side view, partly in section, of the electrical cable installed in the adaptor bushing shown in FIG. 4;

FIG. 6 is an isometric view of the electrical cable prepared for insertion in the bushing shown in FIG. 5; and FIG. 7 is a cross-sectional view taken along the line 7—7 shown in FIG. 5 and looking in the direction of the arrows;

DESCRIPTION OF THE PREFERRED EMBODIMENT

Figures 1, 2, 3, 4:
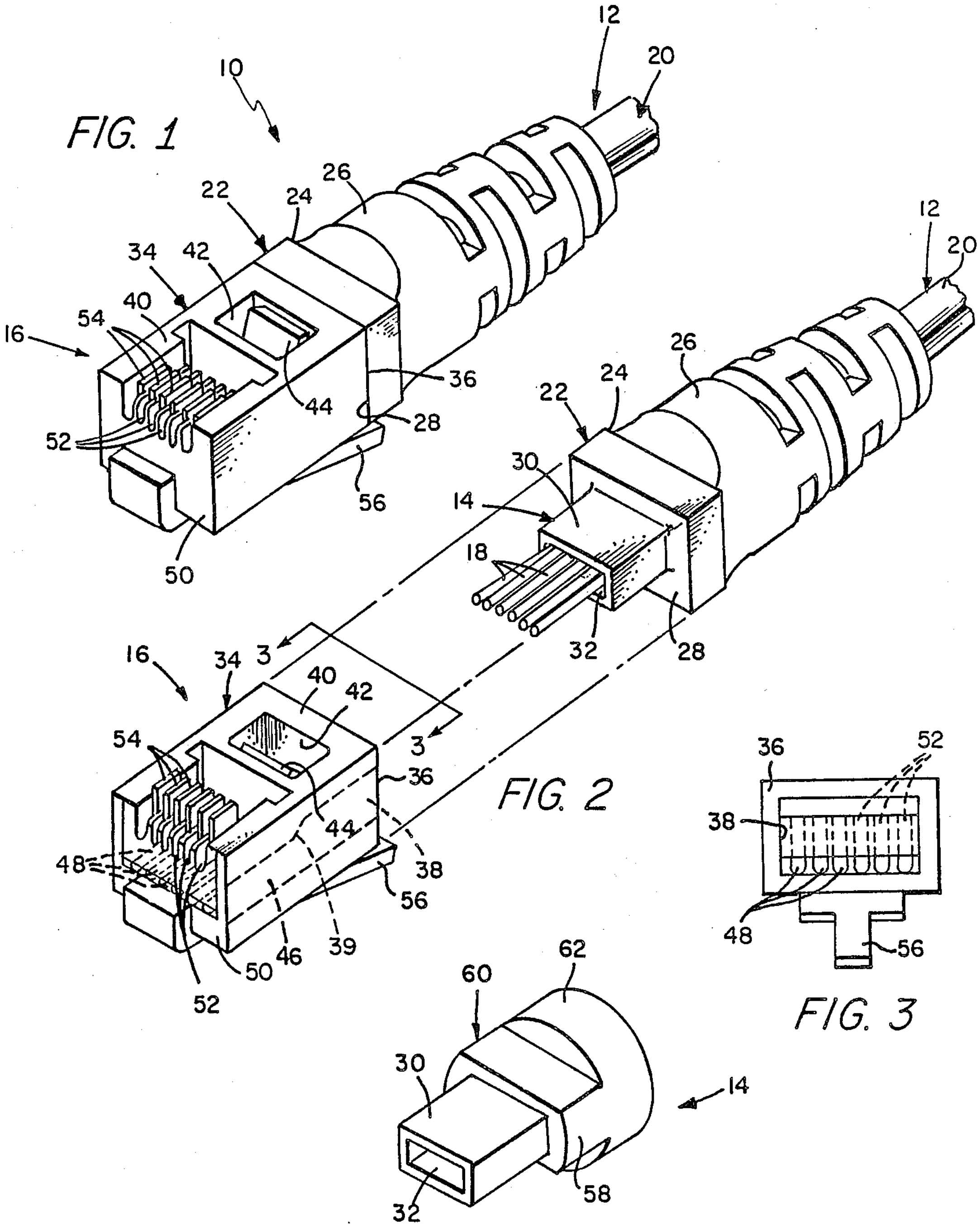
FIG. 1 is an isometric view of an electrical cable assembly embodying the invention.
FIG. 2 is an isometric and partly exploded view of the electrical cable assembly shown in FIG. 1.
FIG. 3 is an elevational end view of the connector taken from line 3—3 shown in FIG. 2 and looking in the direction of the arrows.
FIG. 4 is an isometric view of the adaptor bushing forming a part of the electrical cable assembly shown in FIG. 2.

Referring to the drawings wherein like characters of reference designate like parts, there is shown in FIG. 1–3 an electrical cable assembly 10 comprising a round cable 12 having an end portion provided with an adaptor means 14 for terminating the round cable 12 in a flat cable connector, such as a modular telecom plug 16, for example. Cable 12 includes a plurality of longitudinally extending conductors 18 encircled by an outer jacket 20 having a generally circular cross-sectional configuration and made of dielectric resilient material, such as polyvinylchloride, for example. The conductors 18 may be provided with respective color-coded coatings of dielectric material, such as polyethylene, for example, and extend longitudinally out of an end portion of jacket 20 terminating adjacent an outwardly extending annular flange 22 made of resilient dielectric material.

Flange 22 includes a rearward facing surface 24 which may have extending integrally therefrom a flexible strain relief device 26 provided with a generally frusto-conical structure which encircles the adjacent end portion of jacket 20. The strain relief device 26 has its larger diameter end portion disposed adjacent flange 22 and extends rearwardly therefrom while tapering radially inward of cable 12 to terminate at its smaller diameter end portion which may be only slightly larger than the outer diameter of jacket 20. Thus, the strain relief device 26 prevents sharp bends from occurring in the cable 12 adjacent the flange 22.

The flange 22 also includes a forward facing surface 28 which has extending centrally therefrom a rectangular tubular end portion 30 of adaptor means 14 which is made of resilient dielectric material, such as thermoplastic rubber material, for example. End portion 30 of adaptor means 14 defines a generally rectangular duct-like passageway 32 having extending therefrom an array of juxtaposed end portions of the respective conductors 18 which have specific positions in the array. This predetermined positional relationship of the end portions of conductors 18 with respect to one another is maintained by providing the duct-like passageway 32 with a heighth dimension suitable for restricting the end portions of conductors 18 from crossing laterally over one another.

Connector 16 includes a block-like dielectric body 34 having adjacent adaptor means 14 a trailing end surface 36 wherein there is disposed an open end of a cavity 38 extending into the trailing end portion of body 34. The cavity 38 has a generally rectangular cross-section with respective dimensions slightly greater than the corresponding outer dimension of adaptor means end portion 30. Also, extending downward into the cavity 38 from an overlying surface 40 of body 34 is a generally rectangular hole 42 having rotatably mounted therein a wedge-shaped latching means 44. Accordingly, the end portion 30 of adaptor means 14 may be slidably inserted into the cavity 38 and secured therein by rotating the wedge-shaped latching means 44 into binding engagement with the adjacent surface of the end portion 30. Thus, it may be seen that the end portion 30 of adaptor means 14 is provided with the respective dimensions and the resiliency required for inserting and latching a similar flat cable (not shown) in the cavity 38.

The cavity 38 terminates at a sloped shoulder 39 formed in the roof surface thereof where the cavity 38 communicates with an aligned tunnel-like passageway 46 having a generally rectangular cross-section with a heighth dimension substantially less than the heighth dimension of cavity 38. Disposed in the floor surface of the tunnel-like passageway 46 is a plurality of laterally spaced grooves 48 which extend longitudinally from the cavity 38 to terminate adjacent a leading end surface 50 of the body 34. Each of the grooves 48 has an end portion communicating with an overlying slot 52 wherein a respective contact blade 54 of connector 16 is disposed. Accordingly, when the end portion 32 of adaptor means 14 is inserted slidably into the cavity 38, the end portions of conductors 18 in the array protruding from end portion 32 slide into respective grooves 48 to extend to the ends thereof adjacent leading surface 50 of body 34. Consequently, each of the end portions of conductors 18 in the array is disposed beneath a respective slot 52 and may be electrically connected to the contact blade 54 disposed therein by pressing the contact blade 54 down into the slot 52. As a result, the pressed blade 54 has a lower end portion adjacent the underlying groove 48 pierce through any coating of dielectric material and electrically contact the wire core of the conductor 18. The blades 54 have opposing upper end portions protruding from the respective slots 52 and forming in a leading corner portion of the body 34 an array of laterally spaced contacts which may electrically contact respective contacts (not shown) such as contact tangs in a connector receptacle mounted on a modular unit, for example. Attached to the leading surface 50 of body 34 may be a flexible latching arm 56 for securing the connector plug 16 on a suitable connector receptacle (not shown) in a well-known manner.

As shown in FIGS. 4–5, the adaptor means 14 comprises a pre-molded bushing 60 made of resilient dielectric material, such as thermoplastic material, for example. The bushing 60 has the rectangular tubular end portion 30 integrally joined through an intermediate transitional portion 58 at an opposing cylindrical tubular end portion 62 of the bushing. Externally, the transitional intermediate portion 58 has the appearance of an enlarged extension of rectangular tubular end portion 30. However, the transitional intermediate portion has opposing curved surfaces which are aligned with the outer surface of cylindrical tubular end portion 62 and, therefore, appears to be an extension of a central portion of cylindrical tubular end portion 62. Internally, the walls of intermediate transitional portion 58 define a generally funnel-like passageway 64 having a smaller end communicating with the duct-like passageway 32 in rectangular tubular end portion 30 of bushing 60. The cylindrical tubular end portion 62 of bushing 60 defines an end cavity 66 terminating at an inwardly extending annular shoulder 68 where it communicates with the larger end portion of funnel-like passageway 64.

As shown in FIG. 6, prior to installing the end portion of cable 20 in the bushing 60, the outer jacket 20 is cut back so that more than adequate end portion lengths of the respective conductors 18 protrude longitudinally from the jacket. If the cable 20 is provided with a shield (not shown) disposed in encircling relationship between outer jacket 20 and conductors 18, it may be electrically connected to a bare drain conductor 18 extending longitudinally out of the adjacent end portion of jacket 20 with end portions of the respective other conductors 18. The end portions of conductors 18 protruding from the end portion of jacket 20 are arranged in side-by-side relationship to form an array of juxtaposed end portions of the respective conductors 18 wherein each of the conductors 18 has an end portion disposed in a specific position in the array. The end portions of the conductors 18 may be held in this predetermined side-by-side positional relationship by suitable retainer means, such as a length of tape 70 which encircles the end portions of conductors 18 with sufficient snugness to retain the end portions of conductors 18 in place in the array, for example. The array of end portions is passed longitudinally through the bushing 60 from the cylindrical tubular end portion 62 to the rectangular tubular end portion 32 thereof.

As shown in FIG. 7, the cavity 66 defined by the cylindrical tubular end portion 62 may be provided with a diametric size in one direction which is slightly less than the diametric size of cable 20 and with a diametric size in an orthogonal direction which is greater than the diametric size of cable 20. As a result, when the cut end portion of jacket 20 is forcefully inserted into the cavity 66, the resilient material of jacket 20 will be compressed in one diametric direction and will be expanded in an orthogonal direction to provide anti-rotation means for restricting relative rotation between cable 20 and bushing 60. When the cut end of jacket 20 is seated on the annular shoulder 68 terminating cavity 66, the portions of conductor 18 protruding from the cut end of jacket 20 will be disposed in the funnel-like passageway 64 defined by intermediate transitional portion 58 of bushing 60. Moreover, the end portions of conductors 18 retained in juxtaposed relationship in the array by the tape 70 pass through the rectangular duct-like passageway 32 and protrude from the end of rectangular tubular end portion 30 with respective sufficient lengths for trimming purposes. The sub-assembly comprising cable 12 installed in bushing 60 then may be subjected to a molding operation for producing the flange 22 in encircling relationship with the intermediate transitional portion 58 of bushing 60. Also, the molding operation may produce strain relief device 26 as an integral extension of flange 22 and having its larger diameter end portion anchored about the cylindrical tubular end portion 62 of bushing 60. After the molding operation, the surface 28 of flange 22 may be used as a reference plane for trimming off the excess lengths of the end portions of conductors 18 including the length of tape 70.

Figure 8:
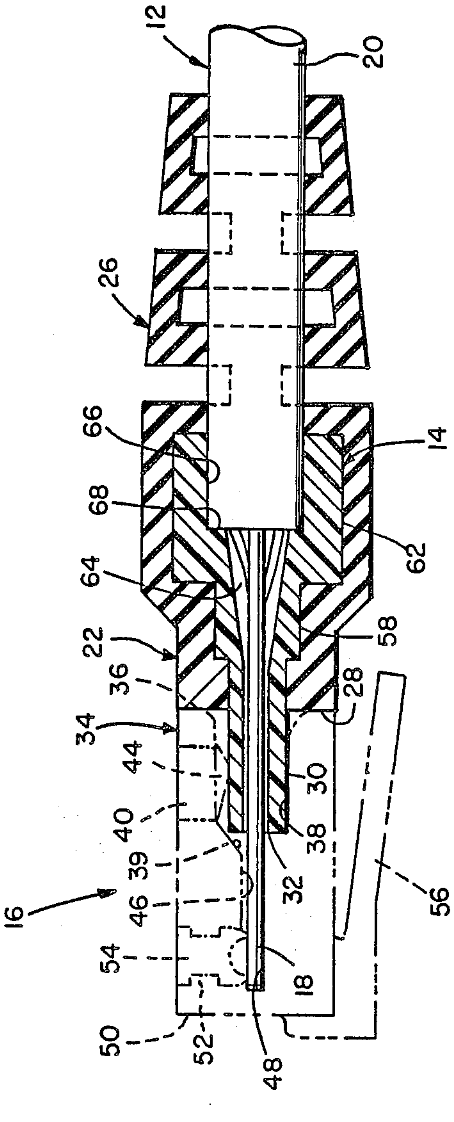
FIG. 8 is an axial view, partly in section, of the electrical cable assembly shown in FIG. 1.

As shown in FIG. 8, when the end portion 30 of bushing 60 is inserted into the cavity 38 of connector 16 shown in FIG. 2, the surface 28 of flange 22 abuts the trailing end surface 36 of connector body 34 (FIG. 2) prior to the end surface of end portion 32 abutting the sloped shoulder 39 terminating cavity 38 and prior to the cut ends of conductors 18 reaching the ends of grooves 48 adjacent the leading surface 50 of connector body 34. Consequently, the surface 28 of flange 22 is produced during the molding operation to be disposed at a suitable distance from the end surface of end portion 30 for preventing the butting engagement of the end surface of end portion 30 with the shoulder terminating cavity 38 in connector body 34. After the molding operation, the end portions of conductors 18 protruding from the end portion 32 are trimmed or cut at a suitable distance "D" (FIG. 5) from the surface 28 of flange 22 to prevent the trimmed ends of conductors 18 from butting against the ends of grooves 48 formed by the leading wall of connector body 34. Preferably, the end portions of conductors 18 are trimmed relative to the plane of flange surface 28 for providing the end portions of conductors 18 with sufficient lengths to stop just short of the terminal end surface of grooves 48. Subsequently, when the contact blades 54 are pressed down in the respective slots 52, spaced points on the adjacent end portions of the blades 54 will pierce into any coatings of dielectric material on the conductors 18 and electrically contact the wires therein.

Thus, there has been disclosed herein an electrical cable assembly having a round cable provided with adaptor means for terminating an end portion of the round cable in a flat cable connector. The adaptor means comprises a bushing having a cylindrical tubular end portion defining a cylindrical cavity of suitable size for having a jacket covered end portion of the round cable press-fitted therein. The bushing also has a transitional intermediate portion defining a funnel-like passageway with a larger end communicating with the cavity. The larger end portion of the funnel-like passageway has a suitable size for allowing the end portions of conductors 18 protruding from the jacket to cross over one another so that each of the conductor end portions can occupy a specific position in an array of juxtaposed conductor end portions passing through the smaller end portion of the funnel-like passageway. The bushing also has a rectangular tubular end portion defining a rectangular duct-like passageway having an end conforming to and communicating with the smaller end portion of the funnel-like passageway. Finally, the bushing may be provided with an outwardly extending flange having a surface spaced a predetermined distance from the terminal end surface of the rectangular tubular end portion of the bushing. Also, the end portions of the conductors extending beyond the terminal end surface of the rectangular tubular end portion of the bushing may be trimmed to have respective terminal end surfaces spaced predetermined distances from the surface of the flange.

From the foregoing, it will be apparent that all of the objectives of this invention have been achieved by the structures and methods described herein. It also will be apparent, however, that various changes may be made by those skilled in the art without departing from the spirit of the invertion as expressed in the appended claims. It is also to be understood, therefore, that all matter shown and described herein is to be interpreted as illustrative rather than as restrictive of the invention.

What is claimed is:

1. An electrical cable adaptor comprising:

a tubular dielectric body having an entrance end portion and an open exit end portion;

first means provided at said entrance end portion of said body for restricting to a position in said entrance end portion an end portion of a round electrical cable having protruding therefrom a plurality of wires; and second means provided at said exit end portion of said body for permitting emergence from said body of a linear array of said wires disposed in juxtaposed relationship with one another and for connecting said body to a flat cable connector, said first means including means for securing said end portion of said round electrical cable in said entrance end portion of said body, and said body including an intermediate portion provided with third means for receiving said wires protruding from said end portion of said round electrical cable and directing said wires in said linear array to said second means at said exit end portion of said body.

2. An electrical cable adaptor as set forth in claim 1 wherein said second means includes means for maintaining said wires in said linear array while directing said wires into flat cable connector.

3. An electrical cable adaptor as set forth in claim 1 wherein said second means includes means for feeding said wires to said flat cable connector while maintaining each of said wires in predetermined positional relationship with respect to the other wires in said linear array.

4. An electrical cable assembly comprising:

a round electrical cable having an end portion provided with a protective jacket and having a plurality of wires extended out of an end of said jacket; and adaptor means disposed about said end portion and said wires for connecting said end portion of said round electrical cable to a flat cable connector, said adaptor means including a tubular body having first end portion means disposed about said end of said jacket for receiving said plurality of wires and second open end portion means disposed about said wires for providing an emergent linear array of said wires disposed in juxtaposed relationship with one another, and said tubular body of said adaptor means including a bushing of resilient dielectric material having a cylindrical first end portion provided with shoulder means for seating said end of said jacket in said first end portion of said bushing and having an intermediate transitional portion provided with funnel-like passageway means for receiving said plurality of wires and ensuring said wires lay in juxtaposed relationship with one another.

5. An electrical cable assembly as set forth in claim 4 wherein each of said wires is disposed in a specific position in said array.

6. An electrical cable assembly as set forth in claim 5 wherein said bushing includes generally rectangular second end portion provided with duct-like passageway means for maintaining said wires in respective specific positions in said array and feeding said array of wires into a flat cable connector.

7. An electrical cable assembly comprising:

a round cable having an end portion provided with a protective jacket and having a plurality of wires extended out of an end of said jacket;

adaptor means disposed about said wires and said end portion of said cable for maintaining said wires in juxtaposed relationship with one another and providing an emergent linear array of juxtaposed wires, said adaptor means including funnel-like means having a mouth end portion disposed adjacent said end of said jacket for permitting said wires extended out of said end of said jacket to extend at an angle to one another and lay in said juxtaposed relationship with one another; and flat cable connector means connected to said adaptor means for receiving said emergent linear array of juxtaposed wires and directing said wires into electrically contactable relationship with respective contacts of said connector means.

8. An electrical cable assembly as set forth in claim 7 wherein said adaptor means includes exit end portion means dimensioned for insertion into said connector means.

9. An electrical cable assembly as set forth in claim 8 wherein said exit end portion means includes resilient means for latchably securing said end portion means to said connector means.

10. An electrical cable assembly as set forth in claim 8 wherein said exit end portion means is provided with positive stop means for determining the distance said end portion means may be inserted into said connector means.

11. An electrical cable assembly as set forth in claim 10 wherein said wires extend from said end portion of said cable respective distances measured from said positive stop means for determining when said wires are in electrically contactable relationship with respective contacts of said connector means.

12. An electrical cable adaptor comprising:

a tubular dielectric body having an entrance end portion integrally joined through an intermediate portion to an open exit end portion of said body;

first means disposed at said entrance end portion for receiving therein an end portion of a round electrical cable having a protective jacket provided with an end and a plurality of wires extended out of said end of said jacket; and funnel-like means disposed in said intermediate portion for receiving said plurality of wires and directing said wires in a linear array to said open exit end portion of said body, the funnel-like means including mouth end portion means disposed adjacent said entrance end portion for permitting said wires to extend from said end of said jacket at angle to one another and lay in juxtaposed relationship with one another in said linear array.

13. An electrical cable adaptor as set forth in claim 12 wherein said funnel-like means includes opposing end portion means of smaller size than said mouth end portion and disposed adjacent said open exit end portion of said body for feeding into said open exit end portion said linear array of juxtaposed wires.

14. An electrical cable adaptor as set forth in claim 13 wherein said open exit end portion of said body is provided with means for maintaining said wires in juxtaposed relationship with one another and permitting emergence of said linear array of juxtaposed wires.

15. An electrical cable adaptor as set forth in claim 14 wherein said open exit end portion of said body also is provided with means for connecting said round electrical cable to a flat cable connector.

* * * * *